United States Patent
Bovensiep

(10) Patent No.: US 10,207,278 B2
(45) Date of Patent: Feb. 19, 2019

(54) CENTRIFUGAL FLUID/PARTICULATE SEPARATOR

(71) Applicant: Cyclext Separator Technologies, LLC, Troy, MI (US)

(72) Inventor: Richard D. Bovensiep, Troy, MI (US)

(73) Assignee: Cyclext Separator Technologies, LLC, Troy, MI (US)

( * ) Notice: Subject to any disclaimer, the term of this patent is extended or adjusted under 35 U.S.C. 154(b) by 103 days.

(21) Appl. No.: 15/147,478

(22) Filed: May 5, 2016

(65) Prior Publication Data

US 2017/0320070 A1    Nov. 9, 2017

(51) Int. Cl.

| | |
|---|---|
| *B04C 1/00* | (2006.01) |
| *B04C 5/103* | (2006.01) |
| *B04C 5/04* | (2006.01) |
| *B04C 3/06* | (2006.01) |
| *B04C 5/13* | (2006.01) |
| *B01D 21/00* | (2006.01) |
| *B04C 3/00* | (2006.01) |

(52) U.S. Cl.
CPC ............... *B04C 5/103* (2013.01); *B04C 3/06* (2013.01); *B04C 5/04* (2013.01); *B04C 5/13* (2013.01); *B01D 21/00* (2013.01); *B04C 2003/006* (2013.01)

(58) Field of Classification Search
USPC ........................................................ 210/512
See application file for complete search history.

(56) References Cited

U.S. PATENT DOCUMENTS

| 1,055,792 | A | * | 3/1913 | Plock ..................... B04C 5/103 |
| | | | | 55/392 |
| 2,010,128 | A | * | 8/1935 | Arnold ..................... B04C 5/04 |
| | | | | 209/710 |
| 2,667,944 | A | * | 2/1954 | Crites ..................... B04C 5/06 |
| | | | | 55/346 |
| 5,078,875 | A | * | 1/1992 | Losing .............. B01D 17/0208 |
| | | | | 210/295 |
| 7,288,202 | B2 | * | 10/2007 | Maier .................... B01D 45/14 |
| | | | | 209/719 |
| 9,861,913 | B2 | * | 1/2018 | Antaya ................ B01D 21/267 |
| 2008/0115469 | A1 | * | 5/2008 | Lane ...................... B01D 45/06 |
| | | | | 55/337 |
| 2009/0139192 | A1 | | 6/2009 | Sams et al. |
| 2012/0187032 | A1 | | 7/2012 | Davey et al. |
| 2013/0199137 | A1 | * | 8/2013 | Hallgren ............... B01D 45/16 |
| | | | | 55/393 |
| 2015/0328567 | A1 | | 11/2015 | Antaya et al. |

FOREIGN PATENT DOCUMENTS

EP            1600215 A1    11/2005

* cited by examiner

*Primary Examiner* — Nina Bhat
(74) *Attorney, Agent, or Firm* — Reising Ethington, P.C.

(57) ABSTRACT

A centrifugal separator separates a mixture of fluid and particulate matter in a cylindrical tank. The mixture enters the tank tangentially through one passage. The mixture is swirled within the tank through the use of angled blades to guide flow rotation, increasing centrifugal force on the mixture. Separated fluid flows into a discharge pipe and out of the tank. The flow of fluid into the discharge pipe may be provided by an opening along the length of the pipe, the fluid may enter and exit the tank at opposing ends, and the angled blades may be circumferentially offset from adjacent blades.

20 Claims, 4 Drawing Sheets

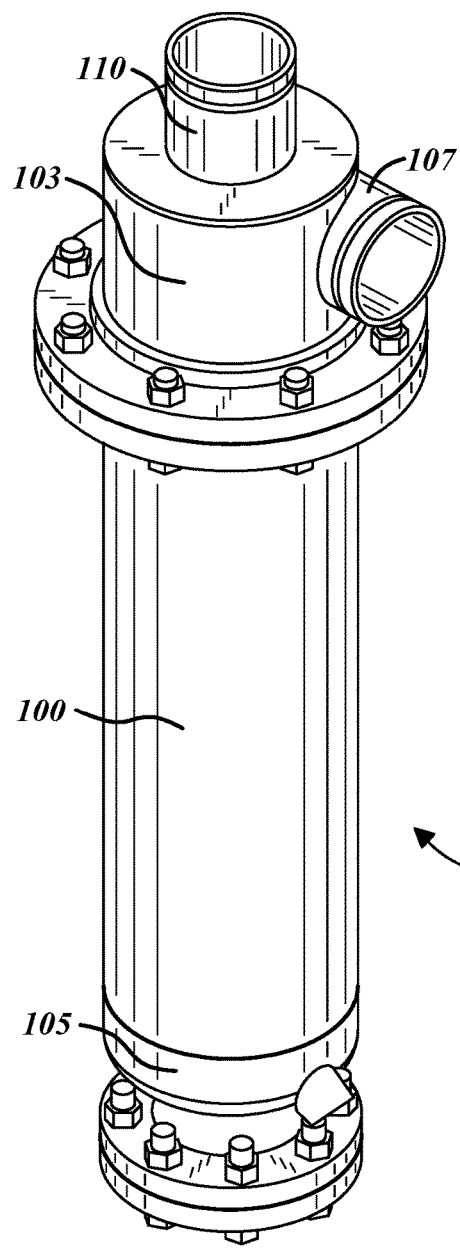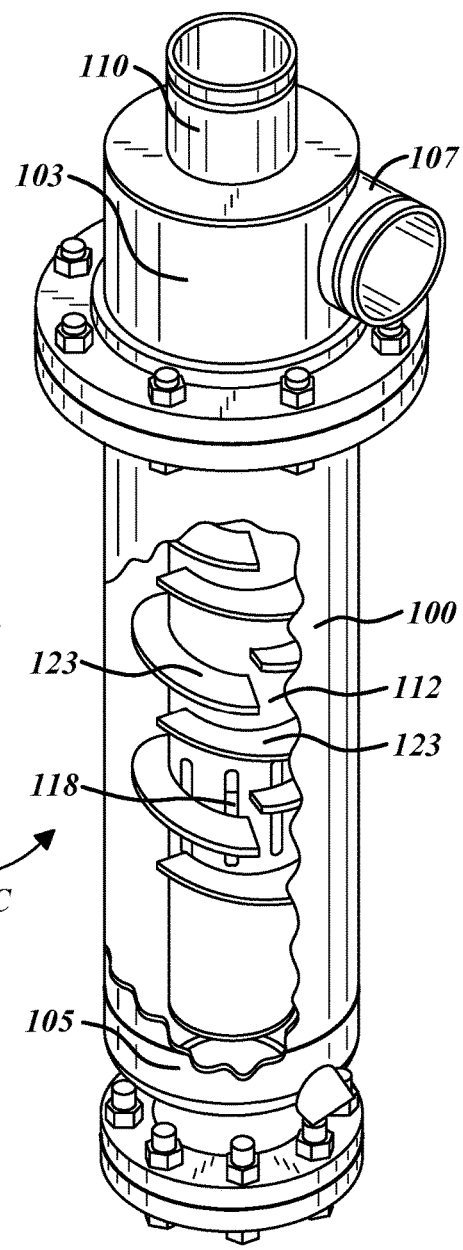
*FIG. 1*  *FIG. 2*

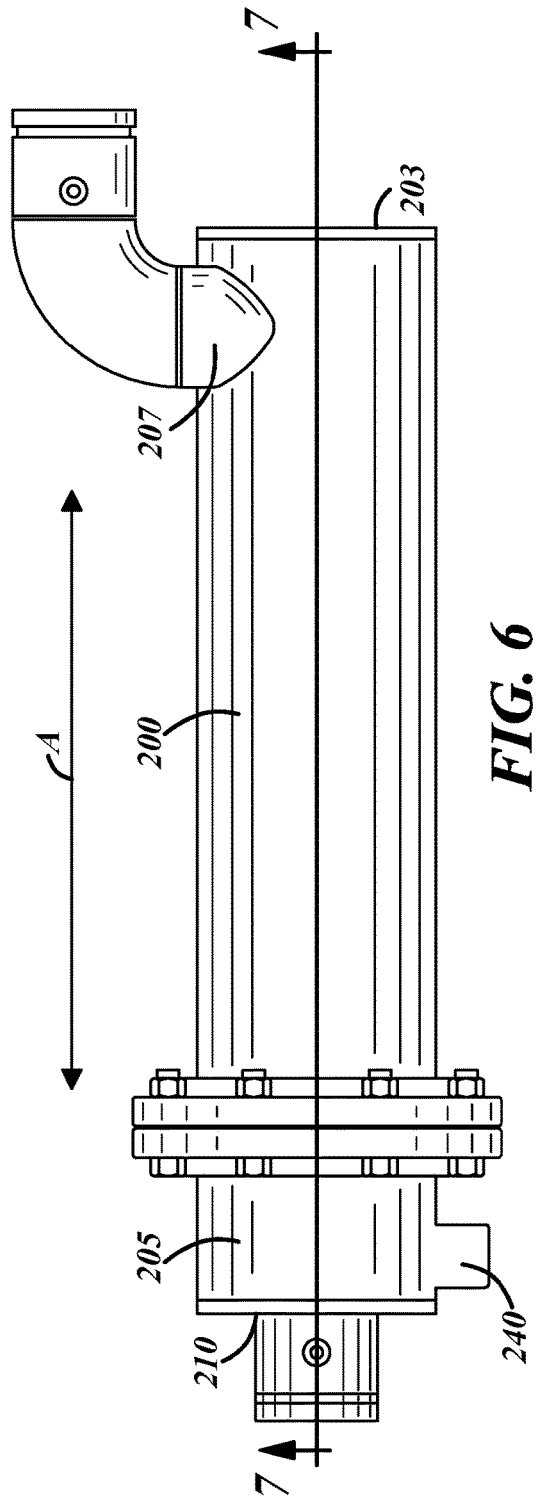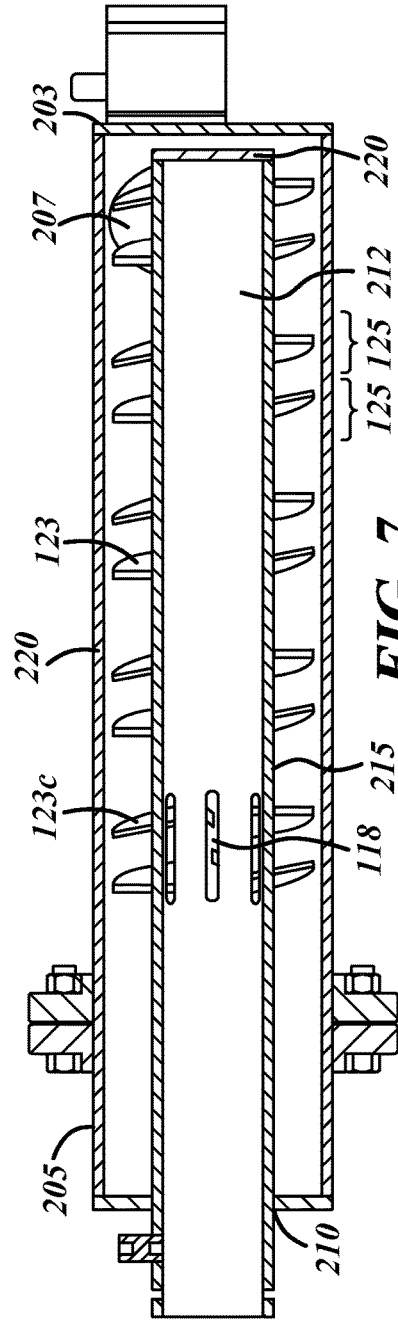

CENTRIFUGAL FLUID/PARTICULATE SEPARATOR

FIELD OF THE INVENTION

The present invention relates to an apparatus for separating particulate matter from a fluid particulate mixture. Specifically, a centrifugal style fluid separation apparatus that utilizes a centrifugal or spiral fluid flow.

BACKGROUND OF THE INVENTION

Centrifugal style separators have been used to separate particulate matter from a fluid mixture. Centrifugal style separators have useful advantages in particular applications. For example, when large amounts of particulate matter is present, mesh and screen type filters may become clogged and fail to allow the necessary or desired fluid flow rate through the separator.

Centrifugal style separators take advantage of rotational forces and gravity to assist in separating suspended particulate matter from a particulate and fluid mixture. The mixture flows into a passage in a top of the separator where it is induced into a centrifugal flow pattern. Separated particulates are retained in the separator, and cleaned fluid flows out of another passage in top, or end of, the separator. The separated particulates are periodically purged from the separator through a port supplied for that purpose. An example of a centrifugal separator is found in US Patent Application Publication 2015/0328567, incorporated herein by reference.

There is room for improvement in the known separator designs to increase their efficiency and performance, and to increase the various locations and applications in which they can be installed.

SUMMARY OF THE INVENTION

One aspect of the present disclosure is a separator comprising a tank having a first end and a second end. The second end of the tank is located opposite the first end. The tank includes an inlet port and an outlet port. The inlet port allows fluid to enter the tank. The inlet port is disposed proximate the first end of the tank. The outlet port allows fluid to exit the tank. A discharge pipe extends from the outlet port and into the tank. A discharge opening is disposed along a length of the discharge pipe. The discharge opening allows fluid to enter the discharge pipe from the tank. Sets of blades are spaced along an outer surface of the discharge pipe.

Another aspect of the present disclosure is a separator comprising a tank having a first end and a second end. The second end of the tank is located opposite the first end. The tank includes an inlet port allowing fluid to enter the tank. The inlet port is disposed proximate the first end of the tank. The tank also includes an outlet port allowing fluid to exit the tank. The outlet port is disposed proximate the second end of the tank. A discharge pipe extends from the outlet port into the tank. Blades are disposed spirally along an outer surface of the discharge pipe.

Another aspect of the present disclosure is a separator comprising a tank with an inlet port allowing fluid to flow into the tank, and an outlet port allowing fluid to flow out of the tank. A discharge pipe extends from the outlet port and into the tank. Sets of blades are spaced along an outer surface of the discharge pipe. A border of one blade in one set is circumferentially offset from a border of another blade in an adjacent set of blades.

Other features and advantages of the present invention will become apparent from the following detailed description of a preferred embodiment, as well as other embodiments, with reference to the accompanying drawings.

BRIEF DESCRIPTION OF THE DRAWINGS

FIG. 1. is a perspective view of a first embodiment of a separator;

FIG. 2 is a perspective view of the first embodiment of the separator with a broken away portion;

FIG. 6 is a side view of a second embodiment of a separator; and

FIG. 7 is a sectional view of the second embodiment of the separator.

DETAILED DESCRIPTION OF THE PREFERRED EMBODIMENTS

Figures 3, 4:
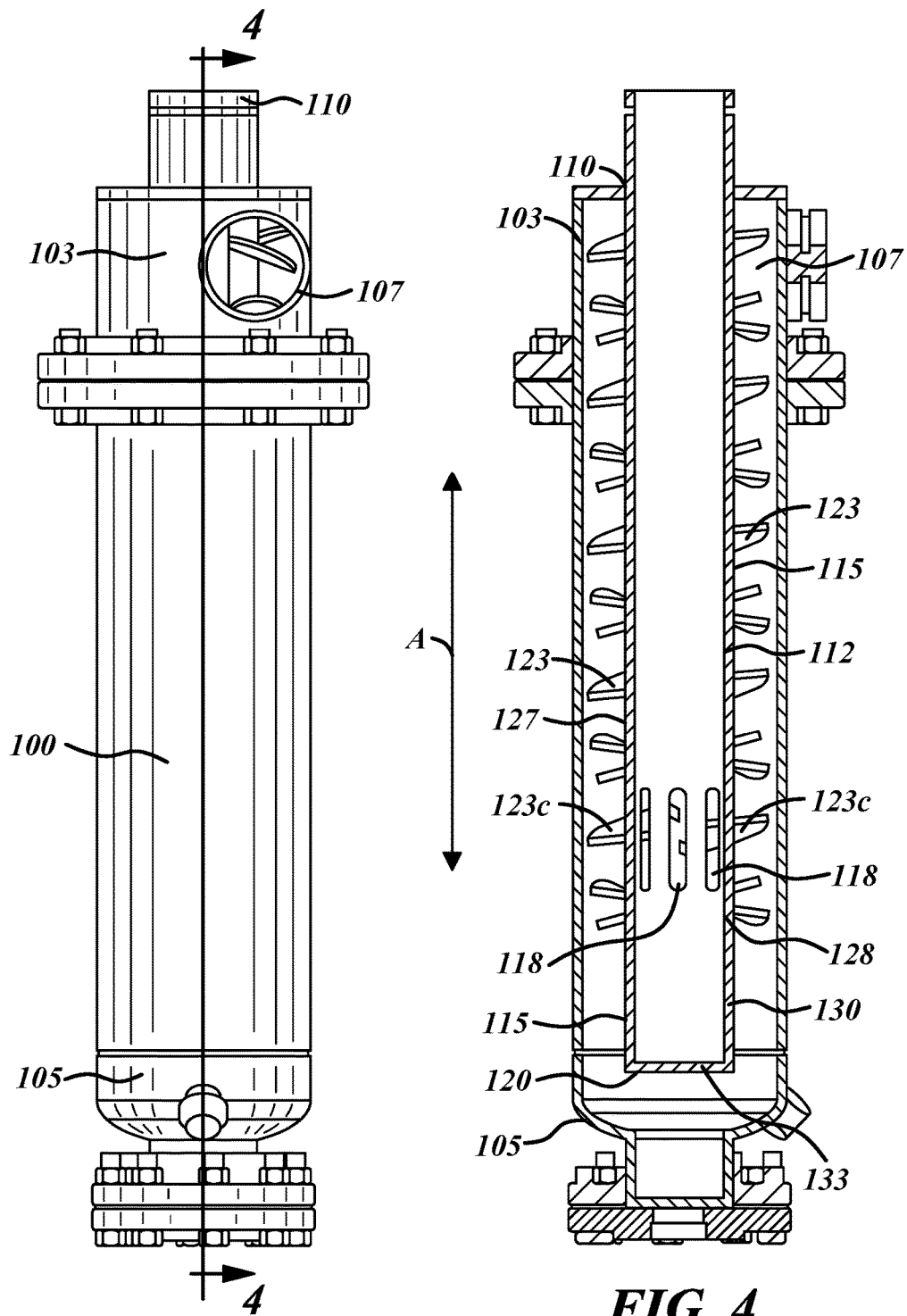
FIG. 3 is a side view of the first embodiment of the separator.
FIG. 4 is a sectional view of the first embodiment of the separator.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

With reference to FIGS. 1 through 5, an embodiment of a fluid separator of the present disclosure is shown, and further described herein.

The fluid separator comprises a tank 100. The tank 100 has a generally cylindrical shape with a circular cross section extending between a first end 103 of the tank 100 and an opposite second end 105 of the tank 100. The tank 100 includes an inlet port 107 and an outlet port 110. The inlet port 107 and outlet port 110 allow fluid to enter and exit the tank 100, respectively.

The inlet port 107 is located proximate the first end 103. The inlet port 107 may be configured to provide fluid flow into the tank 100 in a direction that is generally perpendicular to an axial direction A of the tank 100. The inlet port 107 may have an inner diameter that is equal to or less than half of an inner diameter of the circular cross section of the tank 100, and may be located off center of the tank 100 such that fluid flow into the tank is generally tangential to an inner surface of the tank 100 near the area of the tank 100 where fluid enters from the inlet port 107. Location and sizing of the inlet port 107 in such a manner helps to induce a spiral or cyclone style flow as the fluid moves through the tank 100 from the inlet port 107 to the outlet port 110.

A discharge pipe 112 extends from the outlet port 110 into the tank 100. The discharge pipe 112 extends generally parallel to the axial direction A of the tank 100. The discharge pipe 112 is located along a center line of the tank 100 such that a distance between an outer surface 115 of the discharge pipe 112 is equidistant from an inner surface of the tank 100 around an entire circumference of the outer surface 115 of the discharge pipe 112. The discharge pipe 112 may be made of standard piping, for example, 4 inch schedule 40 sized piping. The size of the piping used to form the discharge pipe 112 may be targeted to be the same size as the inlet pipe 107, the size and dimensions of the tank 100 may be adjusted based on desired flow rates of fluid though the separator.

A discharge opening 118 is disposed along a length of the discharge pipe 112. The discharge opening 118 is spaced apart from a terminal end 120 of the discharge pipe 112. The discharge opening 118 enables fluid flow into the discharge pipe 112, thereby allowing flow to enter the discharge pipe 112 from the tank 100.

Blades 123 extend from the outer surface 115 of the discharge pipe 112. The blades 123 are arranged into sets of blades 125 which are spaced along the outer surface 115 of the discharge pipe 112. The blades 123 are angled, and the sets of blades 125 are arranged, in a manner such that the sets of blades 125 form a spiral configuration.

In operation, a fluid and particulate mixture is introduced into the tank 100 through the inlet port 107. The orientation and position of the inlet port 107 relative to the tank 100 induces a spiral or cyclone type flow onto the fluid particulate mixture. As the fluid particulate mixture travels through the tank 100 towards the discharge opening 118, the sets of blades 125 assist in maintaining and enhancing the centrifugal flow. Centrifugal forces draw the particulate away from the outer surface 115 of the discharge pipe 112, providing fluid flow into the discharge opening 118 that has a lower amount of particulate matter, if any, as compared to the fluid mixture entering the inlet port 107. From the discharge opening 118, the separated fluid flows through the discharge pipe 112 to the outlet port 110. The separated particulate matter remains in the lower portion of the tank 100.

To further assist in suspended particle separation the sets of blades 125 begin on a portion 127 of the discharge pipe 112 nearer to the first end 103 of the tank 100, and extend past the discharge opening 118 to a portion 128 of the discharge pipe 112 nearer to the second end 105 of the tank 100. Arrangement of the sets of blades 125 in such a manner provides that the spiral configuration extends from one side of the discharge opening 118 to an opposite side in the axial direction A, thus assisting in maintaining the centrifugal flow of the fluid in the area proximate the discharge opening 118.

One or more of the blades 123c may partially cover the discharge opening 118. Such covering may include: a blade extending from one edge of the discharge opening 118 to an adjacent edge of the discharge opening 118; a blade extending from one edge of the discharge opening 118 to an opposite edge of the discharge opening 118; and/or a blade extending from one edge of the discharge opening 118 and terminating in the area defined by discharge opening 118 before reaching any other edges. Providing one or more blades 123c that partially cover the discharge opening assists in maintaining the centrifugal flow of the fluid in the area proximate the discharge opening.

The discharge pipe 112 extends towards the second end 105 of the tank 100 beyond the sets of blades 125 at least as far as an outer diameter of discharge pipe 112. The extension is provided by a portion 130 of the discharge pipe 112 having the outer surface 115 free of any blades. The extension of the discharge pipe 112 beyond the set of blades 125 gives a buffer area to the centrifugal flow as it dissipates without inducing turbulence in the fluid, helping to maintain the separation of the particulates from the fluid. Dimensioning of the extension based on the outer diameter of the discharge pipe 112 assists in providing sufficient buffer area for maintaining separation and reducing turbulence.

The tank 100 may further include that the outlet port 110 is disposed proximate the first end 103 of the tank 100. The discharge pipe 112 extending from the outlet port 110 towards the second end 105 of the tank 100. The outlet port 110 and the linearly extending discharge pipe 112 are located generally along a centerline of the tank 100 running in the axial direction A. The discharge pipe 112 ends at the terminal end 120 opposite the outlet port 110. The terminal end 120 of the discharge pipe 112 is spaced apart from the second end 105 of the tank 100. The terminal end 120 of the discharge pipe 112 is sealed with an end cap 133. The sealing of the terminal end, and the separation between the terminal end 120 and the second end 105, provides an area within the tank 100 free of flow directing structures, for example the sets of blades 125 or the discharge pipe 112, such that the cyclic flow of the fluid may be reduced, and particulate matter is enabled to settle out of mixture with the fluid.

The separator may further include a plurality of discharge openings 118 disposed along the length of the discharge pipe 112, with the discharge openings located along the length of the discharge pipe at a similar distance from the first end of the tank 100. The discharge opening may all have a similar size and shape, and be equally spaced in a circumferential direction C around the discharge pipe 112. Each discharge opening 118 may be generally rectangular in shape, have a long axis and a short axis. The long axis of the discharge openings 118 aligns with, or is generally parallel to, the axial direction A of discharge pipe 112. Mathematical CAD analysis has shown that an ideal size of the discharge opening is where the long axis, or length, is the equal to the inner diameter of the pipe, and the short axis, or width, is adjusted provided the desired area the discharge opening 118.

The distance from the first end 103 to one of the discharge openings 118 may be determined by measuring the distance from the first end 103 to a point on the discharge opening 118 closest to the first end 103. The distance between adjacent discharge openings 118 in the circumferential direction C may be determined by measuring the shortest distance between points on adjacent discharge opening 118, with equally spaced discharge openings 118 having a similar distance between adjacent discharge openings 118.

Providing multiple discharge openings 118 spaced equally from each other in a circumferential direction, and/or equally spaced from the first end 103, assists in allowing fluid flow into the discharge pipe 112 without creating unnecessary disruption in the centrifugal fluid flow.

An area is defined by the size of each discharge opening 118. When the discharge opening 118 is generally rectangular, the area is determined by multiplying the length of the long axis of the rectangle by the length of the short axis of the rectangle. A cross-sectional area of the discharge pipe 112 is defined by the size of an internal flow passage of the discharge pipe 112. The cross-sectional area of the discharge pipe 112 may be determined by squaring one half of internal diameter and multiplying the result by pie. The method takes advantage of the following mathematical formula for determining the area of a circle, where A is the area and D is the diameter:

$$A = \left(\frac{D}{2}\right)^2 \pi$$

A sum of the areas of the plurality of discharge openings 118 is greater than or equal to the cross-sectional area of the discharge pipe 112. The relationship between the sum of the areas of the plurality of discharge openings 118 and the cross-sectional area of the discharge pipe 112 regulates the velocity of the fluid entering at the discharge openings 118, preventing unnecessary disruption in the centrifugal flow, and adding in maintaining separation of the particulate matter from the discharge openings. Mathematical CAD modeling has shown that an ideal relationship exists where the sum of the area of the plurality of discharge openings 118 is 1 to 1.5 times the cross-sectional area of the discharge pipe.

With reference to FIGS. 6 and 7, an alternate embodiment of a fluid separator of the present disclosure is shown, and is further described herein.

The fluid separator comprises a tank 200. The tank 200 has a generally cylindrical shape with a circular cross section extending between a first end 203 of the tank 200 and an opposite second end 205 of the tank 200. The tank 200 includes an inlet port 207 and an outlet port 210. The inlet port 207 and outlet port 210 allow fluid to enter and exit the tank 200, respectively.

The inlet port 207 is located proximate the first end 203. The inlet port 207 may be configured to provide fluid flow into the tank 200 in a direction that is generally perpendicular to an axial direction A of the tank 200. The inlet port 207 may have an inner diameter that is equal to or less than half of an inner diameter of the circular cross section of the tank 200, and may be located off center of the tank 200 such that fluid flow into the tank 200 is generally tangential to an inner surface of the tank 200 near the area of the tank 200 where fluid enters from the inlet port 207. Location of and sizing of the inlet port 207 in such a manner helps to induce a spiral or cyclone style flow as the fluid moves through the tank 200 from the inlet port 207 to the outlet port 210.

The outlet port 210 is located proximate the second end 205 of the tank 200. Providing the inlet port 207 proximate the first end 207 opposite the outlet port 210 proximate the second end 205 enables the separator to be installed in-line with the piping carrying the fluid particulate mixture to be separated, thus allowing increased installation options which can be taken advantage of when design a system incorporating a fluid separator.

A discharge pipe 212 extends from the outlet port 210 into the tank 200. The discharge pipe 212 extends generally parallel to the axial direction A of the tank 200. The discharge pipe 212 is located along a center line of the tank 200 such that a distance between an outer surface 215 of the discharge pipe 212 is equidistant from an inner surface of the tank 200 around an entire circumference of the outer surface 215 of the discharge pipe 212. The discharge 212 may be made of standard-piping, for example, 4 inch schedule 40 sized piping. The size of the piping used to form the discharge pipe 212 may be targeted to be the same size as the inlet pipe 207, the size and dimensions of the tank 200 may be adjusted based on the desired flow rates of fluid though the separator.

Blades 123 extend from the outer surface 215 of the discharge pipe 212. The blades 123 are arranged into sets of blades 125 which are spaced along the outer surface 215 of the discharge pipe 112. The blades 123 are angled, and the sets of blades 125 are arranged, in a manner such that the sets of blades 125 form a spiral configuration.

The discharge pipe 212 extends from the outlet port 210 towards the first end 203 of the tank 200. The outlet port 210 and the linearly extending discharge pipe 212 are located generally along a centerline of the tank 200 running in the axial direction A. The discharge pipe 212 ends at the terminal end 220 opposite the outlet port 210. The discharge pipe 212 terminates before reaching the first end 203. Specifically, the terminal end 220 of the discharge pipe 212 is spaced apart from the first end 203 of the tank 200. The terminal end 220 of the discharge pipe 212 is sealed with an end cap. The sealing of the terminal end, and the separation between the terminal end 220 and the second end 205, provides an area within the tank 200 free of flow directing structures, such as the sets of blades 125 or the discharge pipe 212, so that the cyclic flow of the fluid may be reduced, and particulate matter is enabled to settle out of mixture with the fluid.

A discharge opening 118 is disposed along a length of the discharge pipe 212. The discharge opening 118 is spaced apart from a terminal end 220 of the discharge pipe 212. The discharge opening 118 enables fluid flow into the discharge pipe 212, thereby allowing flow to enter the discharge pipe 212 from the tank 200.

A purge port 240 is disposed on the tank 200 proximate the second end 205. The purge port 240 is located generally 180 degrees around the tank 200 from the inlet port 207. The purge port 240 is normally maintained in a closed condition, inhibiting flow of fluid or particulate through the purge port 240. The purge port 240 may be placed in an open position, allowing fluid and particulate flow out of the tank 200. Opening the purge port assists is removing separated particulate matter from the tank 200. When the separator is installed such that the axial direction A of the tank is horizontal, the relative location of the purge port 240 to the inlet port 207 allows fluid to enter the tank 200 at a top location, but may be rotated at any angle, with the purge port 240 at a bottom location. Such configuration increases the effectiveness of the purge port 240 in removing particulate from the tank 200, as separated particulate will collect at the bottom of the tank 200 near the second end 205.

Figure 5:
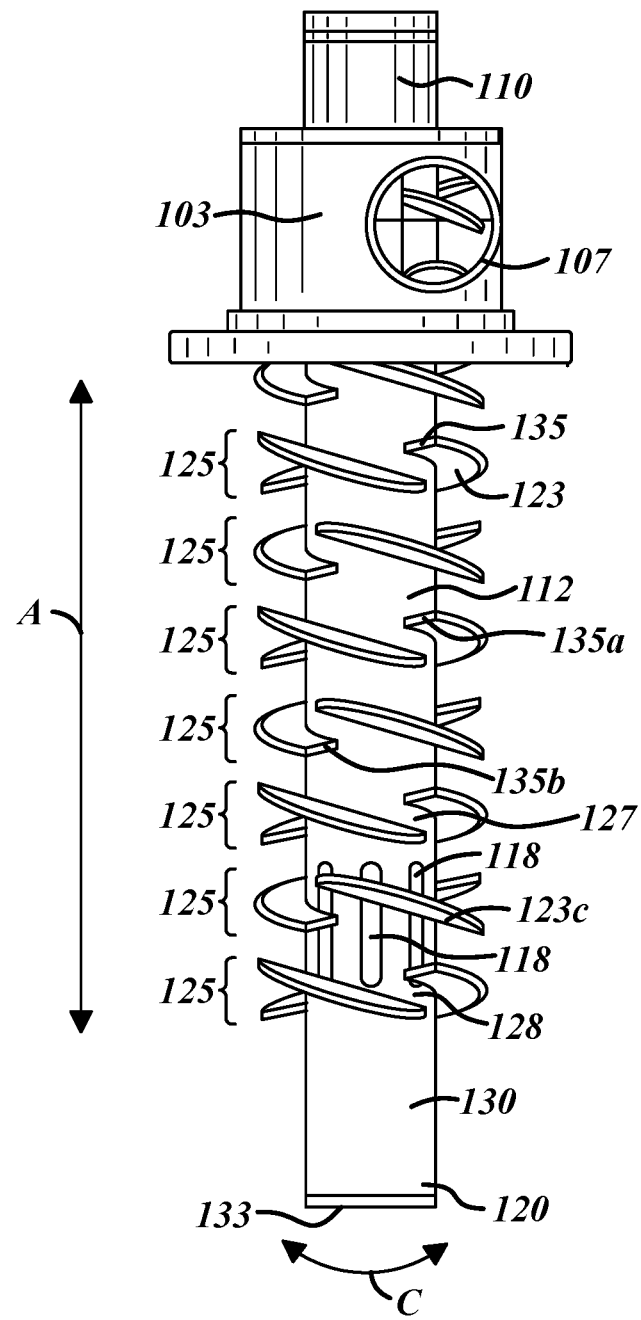
FIG. 5 is a side view of internal components of the first embodiment of the separator.

With reference to FIG. 5, the sets of blades 125 may be configured such that a border 135a of one of the blades 123 is circumferentially offset from a border 135b of another blade 123 in an adjacent set of blades 125. The sets of blades 125 may contain an odd number of blades 123. Specifically, the sets of blades 125 may include three blades 123 to optimize the efficiency of inducing and maintaining a centrifugal flow in relation to production costs. Offsetting the borders 135 of blades 123 in adjacent sets of blades 125 blocks a flow path of fluid in line with the axial direction A, thereby helping to further induce and maintain the centrifugal fluid flow.

It should be understood, of course, that the foregoing relates to exemplary embodiments of the invention and that modifications may be made without departing from the spirit and scope of the invention as set forth in the following claims.

The invention claimed is:

1. A separator comprising:
   a tank having a first end and a second end, the second end located opposite the first end;
   an inlet port allowing fluid to enter the tank, the inlet port disposed proximate the first end of the tank;
   an outlet port allowing fluid to exit the tank;
   a discharge pipe extending from the outlet port and into the tank;
   a plurality of discharge openings disposed along a length of the discharge pipe, each of the discharge openings allowing fluid to enter the discharge pipe from the tank; and sets of blades spaced along an outer surface of the discharge pipe.

2. The separator of claim 1, wherein the sets of blades begin on a portion of the discharge pipe on a side of the plurality of discharge openings nearer to the first end of the tank, and extend past the plurality of discharge openings to a portion of the discharge pipe on a side of the plurality of discharge openings nearer to the second end of the tank.

3. The separator of claim 1, wherein one of the blades partially covers the plurality of discharge openings.

4. The separator of claim 1, wherein the discharge pipe extends toward the second end beyond the sets of blades.

5. The separator of claim 4, wherein the discharge pipe extends toward the second end beyond the sets of blades further than a diameter of the discharge pipe.

6. The separator of claim 1, further comprising:
the outlet port disposed proximate the first end of the tank;
the discharge pipe extending from the outlet port towards the second end of the tank, the discharge pipe including a terminal end spaced apart from the second end of the tank; and
an end cap sealing the discharge pipe at the terminal end.

7. The separator of claim 1, wherein each opening of the plurality of discharge openings is all located along the length of the discharge pipe at a similar distance from the first end of the tank.

8. The separator of claim 7, wherein the plurality of discharge openings are equally spaced in a circumferential direction around the discharge pipe.

9. The separator of claim 1, wherein a sum of the area of the plurality discharge openings is equal to or greater than a cross-sectional area of the discharge pipe.

10. The separator of claim 1, wherein a sum of the area of the plurality of discharge openings is 1 to 1.5 times the cross-sectional area of the discharge pipe.

11. The separator of claim 1, wherein each of the plurality of discharge openings is generally rectangular in shape, with a long axis of the rectangular shape being generally parallel to an axial direction of the discharge pipe.

12. A separator comprising:
a tank having a first end and a second end, the second end located opposite the first end;
an inlet port allowing fluid to enter the tank, the inlet port disposed proximate the first end of the tank;
an outlet port allowing fluid to exit the tank, the outlet port disposed proximate the second end of the tank;
a discharge pipe extending from the outlet port into the tank;
blades disposed spirally along an outer surface of the discharge pipe; and
a discharge opening disposed along a length of the discharge pipe, the discharge opening allowing fluid to enter into the discharge pipe.

13. The separator of claim 12, wherein the discharge pipe terminates before reaching the first end.

14. The separator of claim 12, further comprising:
a purge port disposed on the tank proximate the second end, the purge port located generally 180 degrees around the tank from the inlet port.

15. A separator comprising:
a tank;
an inlet port allowing fluid to flow into the tank;
an outlet port allowing fluid to flow out of the tank;
a discharge pipe extending from the outlet port and into the tank; and
sets of blades spaced along an outer surface of the discharge pipe, a border of one blade in one set being circumferentially offset from a border of another blade in an adjacent set of blades.

16. The separator of claim 15, wherein at least one of the sets of blades comprises an odd number of blades.

17. The separator of claim 16, wherein at least one of the sets of blades comprises three blades.

18. The separator of claim 15, further comprising:
a discharge opening disposed along a length of the discharge pipe, the discharge opening allowing fluid to enter the discharge pipe.

19. A separator comprising:
a tank having a first end and a second end;
an inlet port allowing fluid to enter the tank;
an outlet port allowing fluid to exit the tank, the outlet port disposed proximate the first end of the tank;
a discharge pipe extending from the outlet port and into the tank, the discharge pipe including a sidewall, the discharge pipe including a sealed end cap extending from the sidewall and being spaced apart from the second end of the tank;
at least one discharge opening residing in the sidewall of the discharge pipe and spaced axially from the sealed end cap of the discharge pipe and spaced axially from the outlet port, the discharge opening allowing fluid to enter the discharge pipe from the tank; and
sets of blades spaced along an outer surface of the discharge pipe.

20. The separator of claim 19, wherein the set of blades exhibit an axially-overlapping relationship with the discharge opening.

* * * * *